(12) United States Patent
Kim

(10) Patent No.: US 10,515,545 B2
(45) Date of Patent: Dec. 24, 2019

(54) POSITION DETERMINING DEVICE AND OPERATING METHOD THEREOF

(71) Applicant: Continental Automotive Systems Corporation, Icheon-si (KR)

(72) Inventor: Ji Seon Kim, Icheon-si (KR)

(73) Assignee: Continental Automotive GmbH, Hannover (DE)

( * ) Notice: Subject to any disclaimer, the term of this patent is extended or adjusted under 35 U.S.C. 154(b) by 188 days.

(21) Appl. No.: 15/520,246

(22) PCT Filed: Oct. 30, 2015

(86) PCT No.: PCT/KR2015/011596
§ 371 (c)(1),
(2) Date: Apr. 19, 2017

(87) PCT Pub. No.: WO2016/068657
PCT Pub. Date: May 6, 2016

(65) Prior Publication Data
US 2017/0365167 A1     Dec. 21, 2017

(30) Foreign Application Priority Data

Oct. 31, 2014   (KR) .......................... 10-2014-0149722

(51) Int. Cl.
*G01S 11/14*     (2006.01)
*G08G 1/04*      (2006.01)
(Continued)

(52) U.S. Cl.
CPC ................ *G08G 1/04* (2013.01); *G01S 15/46* (2013.01); *G01S 15/66* (2013.01); *G01S 15/876* (2013.01);
(Continued)

(58) Field of Classification Search
CPC ....... G08G 1/04; G01S 15/931; G01S 15/876; G01S 15/46
See application file for complete search history.

(56) References Cited

U.S. PATENT DOCUMENTS 9,459,347 B2    10/2016 Lucking et al.
2005/0270225 A1*  12/2005 Tokoro ................. G01S 7/4004
                                                  342/70
(Continued)

FOREIGN PATENT DOCUMENTS

CN    101131432 A    2/2008
CN    103119469 A    5/2013
(Continued)

OTHER PUBLICATIONS

Supplementary International Search Report for International Application No. PCT/KR2015/011596, dated Jan. 20, 2017, 8 pages.
(Continued)

*Primary Examiner* — Kira Nguyen
(74) *Attorney, Agent, or Firm* — RatnerPrestia

(57) ABSTRACT

A position determining device and an operating method thereof are disclosed. According to the present invention, a position of a neighboring vehicle is determined by using the differences of the receiving time and strengths between two sensing signals received from two ultrasound sensors installed in a vehicle. Therefore, it is possible to estimate a position and a moving path for neighboring vehicles while driving a vehicle.

5 Claims, 2 Drawing Sheets

(51) Int. Cl.
*G01S 15/46* (2006.01)
*G01S 15/66* (2006.01)
*G01S 15/87* (2006.01)

(52) U.S. Cl.
CPC ....... *G01S 15/931* (2013.01); *G01S 2015/465* (2013.01)

(56) References Cited

U.S. PATENT DOCUMENTS

| | | | |
|---|---|---|---|
| 2011/0026364 A1 | 2/2011 | Lee et al. | |
| 2012/0268310 A1* | 10/2012 | Kim | G01S 13/42 342/70 |
| 2014/0029385 A1* | 1/2014 | Schumann | G01S 15/931 367/99 |

FOREIGN PATENT DOCUMENTS

| | | |
|---|---|---|
| CN | 103442434 A | 12/2013 |
| DE | 102009029465 A1 | 4/2011 |
| EP | 2293102 A1 | 3/2011 |
| JP | 6064273 A | 4/1985 |
| JP | 2002372577 A | 12/2002 |
| JP | 2009210582 A | 9/2009 |
| JP | 2011174735 A | 9/2011 |
| JP | 2013205204 A | 10/2013 |
| KR | 1019990048493 A | 7/1999 |
| KR | 1020110012584 A | 2/2011 |

OTHER PUBLICATIONS

International Search Report and Written Opinion for International Application No. PCT/KR2015/011596, dated Feb. 25, 2016, 8 pages.
Chinese Office Action for Chinese Application No. 201580059166.3, dated Jul. 3, 2019 with translation, 18 pages.
Japanese Notice of Reasons for Refusal for Japanese Application No. 2017-522863, dated May 24, 2019 with translation, 14 pages.

* cited by examiner

[Figure 1]
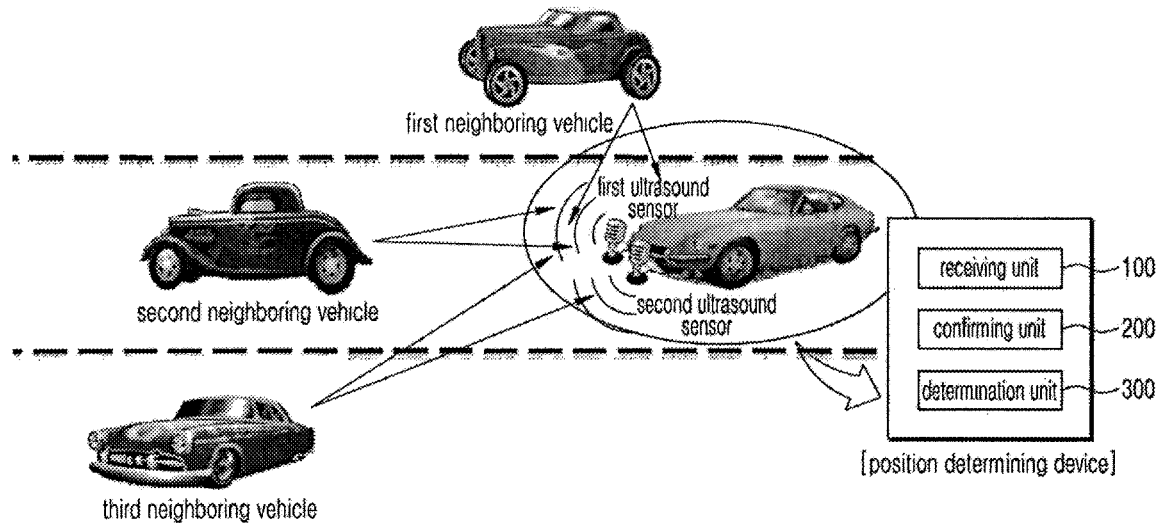
[Figure 2]
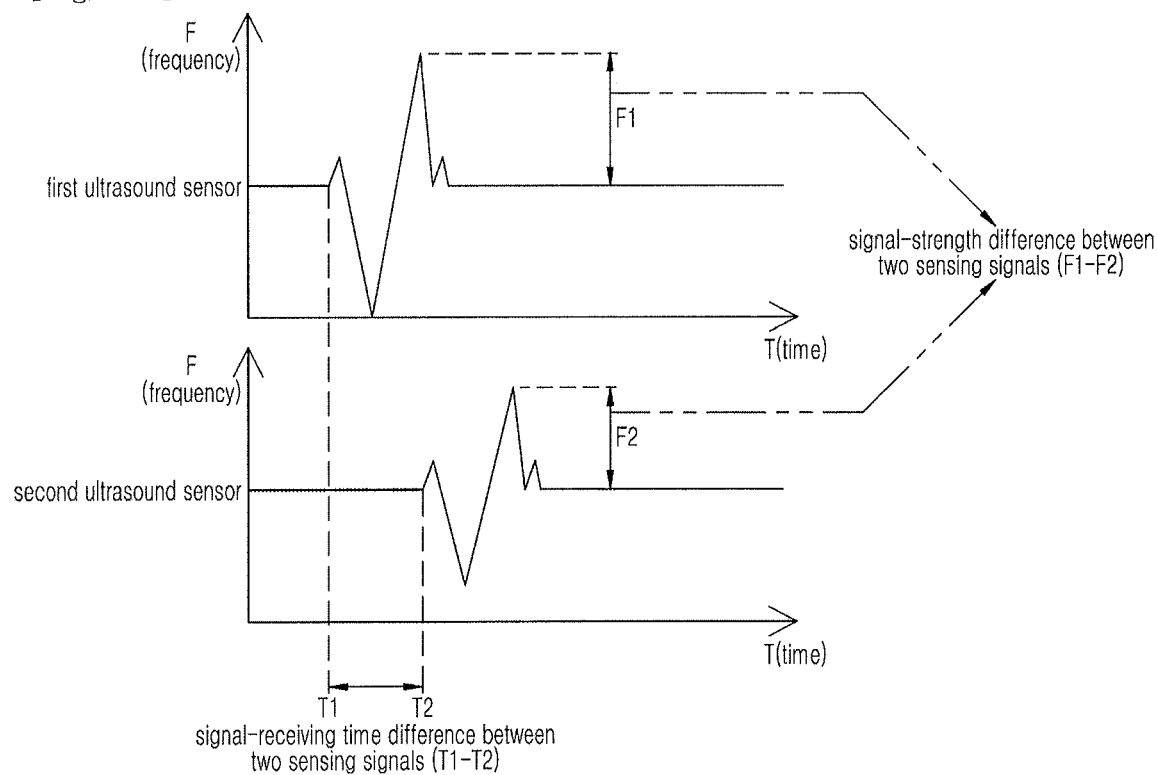

[Figure 3]
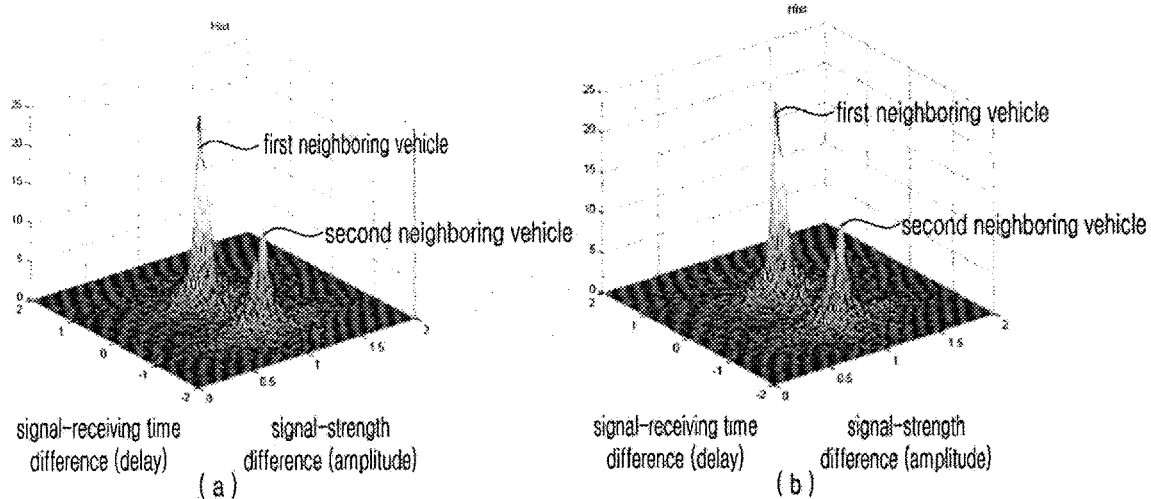
[Figure 4]
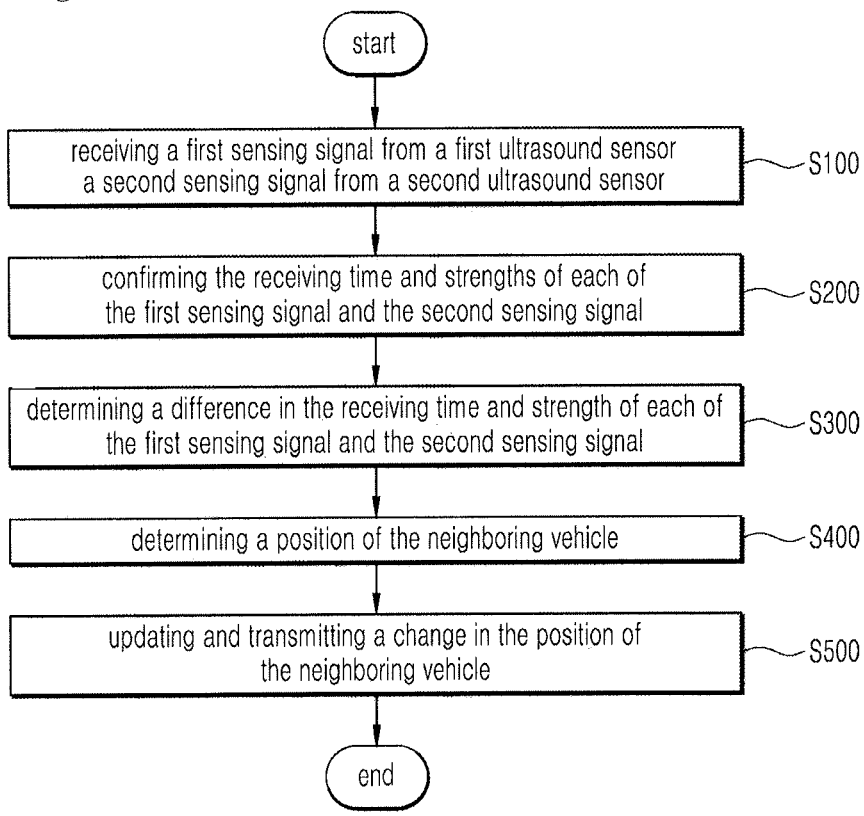

POSITION DETERMINING DEVICE AND OPERATING METHOD THEREOF

CROSS REFERENCE TO RELATED APPLICATIONS

This application is the U.S. National Phase Application of PCT International Application No. PCT/KR2015/011596, filed Oct. 30, 2015, which claims priority to Korean Patent Application No. 10 2014 0149722, filed Oct. 31, 2014, the contents of such applications being incorporated by reference herein.

TECHNICAL FIELD

The present invention relates to determining a position of a neighboring vehicle only by using sensing signals received from two ultrasound sensors installed in a vehicle.

BACKGROUND OF THE INVENTION

In general, a collision avoidance device refers to safety devices configured to prevent or avoid a collision of vehicles.

Recently vehicles have developed into intelligent vehicles that not only enhance fuel efficiency and performance as a means of transportation but also provide improved safety and convenience using evolving information and communication technologies. For intelligent vehicles, however, a driver ends up operating additional operational instruments besides those for driving, such as entertainment systems, convenience systems and air cleaning apparatuses, resulting in an increase of risk in driving due to driver inattention.

As such, a safety device is required to prevent or avoid a vehicle collision on congested urban roads caused by the momentary inattention of a driver.

SUMMARY OF THE INVENTION

An aspect of the invention is determining a position of a neighboring vehicle by using the differences of the receiving time and strengths between two sensing signals received from two ultrasound sensors installed in a vehicle.

In accordance with an aspect of the present invention, a position determining device for determining a position of a neighboring vehicle comprises: a receiving unit for receiving a first sensing signal related to the neighboring vehicle from a first ultrasound sensor installed in a vehicle and receiving a second sensing signal related to the neighboring vehicle from a second ultrasound sensor installed at a position separated away from the first ultrasound sensor; and a determination unit for determining the position of the neighboring vehicle on the basis of receiving time and strengths of each of the first sensing signal and the second sensing signal.

The position determining device may further comprise a confirming unit for confirming the receiving time and strengths of each of the first sensing signal and the second sensing signal, and wherein the confirming unit positions each of the first sensing signal and the second sensing signal on a time-frequency plane to thereby confirm the receiving time and strengths of each of the first sensing signal and the second sensing signal.

The determination unit may determine a position of the neighboring vehicle on the basis of a difference in the receiving time and strength of each of the first sensing signal and the second sensing signal.

The difference in the receiving time and strength of each of the first sensing signal and the second sensing signal may be confirmed from a relative signal attenuation-time delay histogram which is generated with respect to one signal of the first and the second sensing signals on the basis of the other signal thereof on the time-frequency plane.

In accordance with another aspect of the present invention, a method of operating a position determining device for determining a position of a neighboring vehicle comprises the steps of: receiving a first sensing signal related to the neighboring vehicle from a first ultrasound sensor installed in a vehicle and receiving a second sensing signal related to the neighboring vehicle from a second ultrasound sensor installed at a position separated away from the first ultrasound sensor; and determining the position of the neighboring vehicle on the basis of receiving time and strengths of each of the first sensing signal and the second sensing signal.

The method may further comprise confirming the receiving time and strengths of each of the first sensing signal and the second sensing signal, and wherein the step of confirming positions each of the first sensing signal and the second sensing signal on a time-frequency plane to thereby confirm the receiving time and strengths of each of the first sensing signal and the second sensing signal.

The step of determining may determine a position of the neighboring vehicle on the basis of a difference in the receiving time and strength of each of the first sensing signal and the second sensing signal.

The difference in the receiving time and strength of each of the first sensing signal and the second sensing signal may be confirmed from a relative signal attenuation-time delay histogram which is generated with respect to one signal of the first and the second sensing signals on the basis of the other signal thereof on the time-frequency plane.

In accordance with still another aspect of the present invention, a computer program stored in a medium is configured for executing the steps of receiving a first sensing signal relating to a neighboring vehicle from a first ultrasound sensor installed in a vehicle and receiving a second sensing signal related to the neighboring vehicle from a second ultrasound sensor installed at a position separated away from the first ultrasound sensor; and determining the position of the neighboring vehicle on the basis of receiving time and strengths of each of the first sensing signal and the second sensing signal.

According to an aspect of the present invention, a position of a neighboring vehicle is determined by using the differences of the receiving time and strengths between two sensing signals received from two ultrasound sensors installed in a vehicle. Therefore, it is possible to estimate a position and a moving path for neighboring vehicles while driving a vehicle.

BRIEF DESCRIPTION OF THE DRAWINGS

FIG. 1 is a diagram of a position determining device in accordance with an embodiment of the present invention.

FIGS. 2 and 3 are for explaining who to determine a position in accordance with an embodiment of the present invention.

FIG. 4 is a flow chart for explaining the operating of the position determining device in accordance with an embodiment of the present invention.

DETAILED DESCRIPTION OF THE PREFERRED EMBODIMENTS

Hereinafter, an embodiment of the present invention will be described with reference to figures.

FIG. 1 is a diagram of a position determining device in accordance with an embodiment of the present invention.

As depicted in FIG. 1, a position determining device in accordance with an embodiment of the present invention may comprise a receiving unit (100) for receiving sensing signals from ultrasound sensors, a confirming unit (200) for confirming the receiving time and strengths of the sensing signals, and a determination unit (300) for determining a position of a neighboring vehicle on the basis of receiving time and strengths of each of the sensing signals.

The position determining device comprising the receiving unit (100), the confirming unit (200) and the determination unit (300) may be at least partly implemented in a form of a software module, a hardware module or any combination thereof.

The position determining device in accordance with an embodiment of the present invention may be operated to determine a position of an approaching vehicle while driving a vehicle.

Recently, a driver ends up operating additional operational instruments besides those for driving resulting in an increase of risk in driving due to driver inattention. As such, a safety device is required to prevent or avoid a vehicle collision on congested urban roads. To this end, conventional techniques determine a position of a neighboring vehicle by applying a position tracking algorithm using micro array sensors. For micro array sensors, although a plurality of sensors are applied in an array, not all sensing signals received from the plurality of sensors are used to determine the position of the neighboring vehicle, rather sensing signals received from only some of the plurality of sensors are used to determine the position of the neighboring vehicle. Consequently, this is very economically ineffective.

However, in accordance with an embodiment of the present invention, it is possible to determine a position of a neighboring vehicle only by using two ultrasound sensors, as will be explained in detail. Hereinafter, the two ultrasound sensors for determining a position of the neighboring vehicle are referred to a first ultrasound sensor and a second ultrasound sensor, respectively. The first ultrasound sensor and the second ultrasound sensor are installed separated away from each other in a vehicle.

The receiving unit (100) may receive sensing signals. The receiving unit (100) may receive a first sensing signal related to the neighboring vehicle from a first ultrasound sensor installed in a vehicle and receive a second sensing signal related to the neighboring vehicle from a second ultrasound sensor installed at a position separated away from the first ultrasound sensor.

The first sensing signal and the second sensing signal may be the ultrasound signals which are generated at the same time, reflected from the neighboring vehicle and then received. For this, the first ultrasound sensor and the second ultrasound sensor may be configured to generate ultrasound signals at the same time and receive their reflected signals. Alternatively, the first ultrasound sensor and the second ultrasound sensor may be configured to sense an ultrasound signal which is generated from a separate ultrasound generator at a specific point of time by having the separate ultrasound generator generating the ultrasound signal.

The confirming unit (200) may confirm the receiving time and strengths of the sensing signals. If the first sensing signal and the second sensing signal are received via the receiving unit (100), the confirming unit (200) may confirm the receiving time and strengths of each of the first sensing signal and the second sensing signal. In particular, the confirming unit (200) may position each of the first sensing signal and the second sensing signal on a time-frequency plane to thereby confirm the receiving time and strengths of each of the first sensing signal and the second sensing signal.

There may be a difference in the receiving time and strength of each of the first sensing signal and the second sensing signal as depicted in FIG. 2 for example. The difference in the receiving time and strength between the first sensing signal and the second sensing signal occurs because, due to the fact of that the first ultrasound sensor and the second ultrasound sensor are installed separated away from each other in a vehicle, the distance difference corresponding to the separation distance in receiving the ultrasound signals reflected from the neighboring vehicle occurs.

The confirming unit (200) may confirm the difference in the receiving time and strength of each of the first sensing signal and the second sensing signal by using a relative signal attenuation-time delay histogram which is generated with respect to one of the sensing signals on the basis of the other signal on the time-frequency plane as in depicted in FIG. 3, for example.

The determination unit (300) may determine a position of the neighboring vehicle. The determination unit (300) may determine a position of the neighboring vehicle on the basis of a difference in the receiving time and strength of each of the first sensing signal and the second sensing signal.

In particular, the determination unit (300) may calculate a distance between the first ultrasound sensor and the neighboring vehicle and a distance between the second ultrasound sensor and the neighboring vehicle on the basis of receiving time and strengths of each of the first sensing signal and the second sensing signal. In addition, the determination unit (300) may determine a position of the neighboring vehicle on the basis of the two calculated distances and the separation distance between the first ultrasound sensor and the second ultrasound sensor.

For example, the determination unit (300) may form a triangle consisting of a straight line corresponding to the calculated distance between the first ultrasound sensor and the neighboring vehicle, a straight line corresponding to the calculated distance between the second ultrasound sensor and the neighboring vehicle and a straight line corresponding to the separation distance between the first ultrasound sensor and the second ultrasound sensor. Then, the determination unit (300) may determine the other vertex rather than two vertexes corresponding to the first ultrasound sensor and the second ultrasound sensor as a position of the neighboring vehicle.

The difference in the receiving time and strength of each of the first sensing signal and the second sensing signal represents a distance difference of the distance between the first ultrasound sensor and the neighboring vehicle from the distance between the second ultrasound sensor and the neighboring vehicle.

Accordingly, the determination unit (300) can specifically determine a position of the neighboring vehicle by using the distance difference of the distance between the first ultrasound sensor and the neighboring vehicle from the distance between the second ultrasound sensor and the neighboring vehicle, in addition to the separation distance between the first ultrasound sensor and the second ultrasound sensor.

The difference in the receiving time and the difference in strength between the first sensing signal and the second sensing signal may change in sequence of '(a)'→'(b)' as depicted in FIG. 3 as the neighboring vehicle moves. Accordingly, the confirming unit (200) may periodically confirm the difference in the receiving time and the difference in strength between the first sensing signal and the second sensing signal. In this case, the determination unit (300) may periodically determine the changing position of the neighboring vehicle by using the periodically confirmed differences. Thus, it is possible to send an alarm to the driver or show the change of the position of the neighboring vehicle over time.

In accordance with a position determining device of the present invention, a position of a neighboring vehicle can be determined by using the differences of the receiving time and strengths between two sensing signals received from two ultrasound sensors installed in a vehicle. Therefore, it is possible to estimate a position and a moving path for neighboring vehicles while driving a vehicle.

Hereinafter, an operating method of a position determining device in accordance with an embodiment of the present invention will be described with reference to FIG. 4. The same reference numerals are used to designate the same elements as those in FIG. 1. First, it is performed receiving a first sensing signal related to the neighboring vehicle from a first ultrasound sensor installed in a vehicle and receiving a second sensing signal related to the neighboring vehicle from a second ultrasound sensor installed at a position separated away from the first ultrasound sensor (S100). The first sensing signal and the second sensing signal may be the ultrasound signals which are generated at the same time, reflected from the neighboring vehicle and then received. For this, the first ultrasound sensor and the second ultrasound sensor may be configured to generate ultrasound signals at the same time and receive their reflected signals.

Next, the confirming unit (200) may confirm the receiving time and strengths of each of the first sensing signal and the second sensing signal if the first sensing signal and the second sensing signal are received via the receiving unit (100)(S200). The confirming unit (200) may position each of the first sensing signal and the second sensing signal on a time-frequency plane to thereby confirm the receiving time and strengths of each of the first sensing signal and the second sensing signal.

In addition, the confirming unit (200) may confirm the difference in the receiving time and strength of each of the first sensing signal and the second sensing signal (S300). In this case, the confirming unit (200) may confirm the difference in the receiving time and strength between the first sensing signal and the second sensing signal by using a relative signal attenuation-time delay histogram which is generated with respect to one of the sensing signals on the basis of the other signal on the time-frequency plane. Next, the determination unit (300) may determine a position of the neighboring vehicle on the basis of a difference in the receiving time and strength of each of the first sensing signal and the second sensing signal (S400).

In particular, the determination unit (300) may calculate a distance between the first ultrasound sensor and the neighboring vehicle and a distance between the second ultrasound sensor and the neighboring vehicle on the basis of receiving time and strengths of each of the first sensing signal and the second sensing signal. In addition, the determination unit (300) may determine a position of the neighboring vehicle on the basis of the two calculated distances and the separation distance between the first ultrasound sensor and the second ultrasound sensor.

The confirming unit (200) may periodically confirm the difference in the receiving time and the difference in strength between the first sensing signal and the second sensing signal. In this case, the determination unit (300) may periodically determine the changing position of the neighboring vehicle by using the periodically confirmed differences. Thus, it is possible to send an alarm to the driver or show the change of the position of the neighboring vehicle over time (S500).

In accordance with a method of operating a position determining device of the present invention, a position of a neighboring vehicle can be determined by using the differences of the receiving time and strengths between two sensing signals received from two ultrasound sensors installed in a vehicle. Therefore, it is possible to estimate a position and a moving path for neighboring vehicles while driving a vehicle.

Implementations of the functional operations and subject matter described herein may be realized by digital electronic circuitry, computer software, firmware or hardware including the structures described herein and structural equivalents thereof, or a combination of one or more thereof. Implementations of the subject matter described herein may be implemented as one or more computer program products, that is, one or more modules related to computer program instructions encoded on a tangible program storage medium to control an operation of a processing system or to execute it by the computer program instructions.

Although the operations are illustrated in a particular order in the present disclosure, it is not to be understood that the operations should be sequentially performed according to such order or that all the operations illustrated should be performed, in order to acquire a preferred result. In a particular case, multi-tasking and parallel processing may be advantageous. Further, it should not be understood that the separation of various system components in the above embodiments is required in all embodiments, and it should be noted that the program component and systems may be generally integrated into a single software product or may be packaged into multiple software products.

Thus, the present disclosure is not intended to limit the invention to the specific terms set forth. Although exemplary embodiments of the present invention have been described for illustrative purposes, those skilled in the art will appreciate that various modifications, additions and substitutions are possible, without departing from the essential features and the scope and spirit of the invention as disclosed in the accompanying claims. Therefore, it should be appreciated that the embodiments described above are not limitative, but only illustrative.

The invention claimed is:

1. A position determining device for determining a position of a neighboring vehicle, comprising:
   a processor configured to:
      receive a first sensing signal related to the neighboring vehicle from a first ultrasound sensor installed in a vehicle;
      receive a second sensing signal related to the neighboring vehicle from a second ultrasound sensor installed at a position separated away from the first ultrasound sensor;
      determine the position of the neighboring vehicle on the basis of receiving time and strengths of each of the first sensing signal and the second sensing signal;
      confirm the receiving time and strengths of each of the first sensing signal and the second sensing signal;
      position each of the first sensing signal and the second sensing signal on a time-frequency plane to confirm the receiving time and strengths of each of the first sensing signal and the second sensing signal; and determine a position of the neighboring vehicle on the basis of a difference in the receiving time and strength of each of the first sensing signal and the second sensing signal.

2. The position determining device for determining a position of a neighboring vehicle according to claim 1, wherein the difference in the receiving time and strength of each of the first sensing signal and the second sensing signal is confirmed from a relative signal attenuation-time delay histogram which is generated with respect to one signal of the first and the second sensing signals on the basis of the other signal thereof on the time-frequency plane.

3. A method of operating a position determining device for determining a position of a neighboring vehicle, comprising:
   receiving a first sensing signal related to the neighboring vehicle from a first ultrasound sensor installed in a vehicle and receiving a second sensing signal related to the neighboring vehicle from a second ultrasound sensor installed at a position separated away from the first ultrasound sensor;
   determining the position of the neighboring vehicle on the basis of receiving time and strengths of each of the first sensing signal and the second sensing signal; and
   confirming the receiving time and strengths of each of the first sensing signal and the second sensing signal,
   wherein the step of confirming positions each of the first sensing signal and the second sensing signal on a time-frequency plane to confirm the receiving time and strengths of each of the first sensing signal and the second sensing signal, and
   wherein the step of determining determines a position of the neighboring vehicle on the basis of a difference in the receiving time and strength of each of the first sensing signal and the second sensing signal.

4. The method of operating a position determining device for determining a position of a neighboring vehicle according to claim 3, wherein the difference in the receiving time and strength of each of the first sensing signal and the second sensing signal is confirmed from a relative signal attenuation-time delay histogram which is generated with respect to one signal of the first and the second sensing signals on the basis of the other signal thereof on the time-frequency plane.

5. A computer program stored in a non-transitory medium for executing:
   receiving a first sensing signal relating to a neighboring vehicle from a first ultrasound sensor installed in a vehicle and receiving a second sensing signal related to the neighboring vehicle from a second ultrasound sensor installed at a position separated away from the first ultrasound sensor;
   determining the position of the neighboring vehicle on the basis of receiving time and strengths of each of the first sensing signal and the second sensing signal; and
   confirming the receiving time and strengths of each of the first sensing signal and the second sensing signal,
   wherein the step of confirming positions each of the first sensing signal and the second sensing signal on a time-frequency plane to confirm the receiving time and strengths of each of the first sensing signal and the second sensing signal, and
   wherein the step of determining determines a position of the neighboring vehicle on the basis of a difference in the receiving time and strength of each of the first sensing signal and the second sensing signal.

* * * * *